United States Patent
Asai et al.

[19]

[11] Patent Number: 6,081,492
[45] Date of Patent: Jun. 27, 2000

[54] DISC PLAYER REPRODUCTION CIRCUIT WITH REPRODUCTION SPEED DEPENDENT VFO

[75] Inventors: Nobuyuki Asai; Shinobu Nakamura, both of Kanagawa, Japan

[73] Assignee: Sony Corporation, Tokyo, Japan

[21] Appl. No.: 09/042,040

[22] Filed: Mar. 13, 1998

[30] Foreign Application Priority Data

Mar. 21, 1997 [JP] Japan .................................... 9-068811

[51] Int. Cl.$^7$ .............................. G11B 27/36; G11B 5/09
[52] U.S. Cl. ............................................... 369/59; 360/51
[58] Field of Search .................................. 369/59; 360/51, 360/61, 73.03

[56] References Cited

U.S. PATENT DOCUMENTS

5,353,271  10/1994  Abe ........................................... 369/59

*Primary Examiner*—W. Chris Kim
*Attorney, Agent, or Firm*—Ronald P. Kananen; Rader, Fishman & Grauer

[57] ABSTRACT

A disc reproduction device, in which at the time of normal reproduction, a rotational speed of a spindle is detected based on a reproduction signal from the disc by a rotational speed counting circuit, a control signal that makes a speed error with respect to a reference speed zero is given to a first VCO as the control voltage thereof, a reproduction clock is generated while controlling the frequency and phase at a digital PLL circuit by using the oscillation output thereof as the reference frequency of the first PLL circuit containing a second VCO and in which, at the time of access, the control signal to the first VCO is switched to the output signal of the phase comparator by the switch circuit under the control of the controller and a multiple PLL circuit containing the first VCO, phase comparator, LPF, and so forth, is constituted to make the oscillation frequency of the first VCO track the reproduction speed at the destination of access predicted based on the access information by the controller. As a result, the access time can be reduced.

12 Claims, 11 Drawing Sheets

| OUTPUT OF PHASE COMPARATOR | | OUTPUT OF VPCO TERMINAL | |
|---|---|---|---|
| VCOH | VCOL | INV.VPCO=L | INV.VPCO=H |
| 0 | 0 | H | L |
| 0 | 1 | PROHIBITED | PROHIBITED |
| 1 | 0 | HiZ | HiZ |
| 1 | 1 | L | H |

FIG. 11

DISC PLAYER REPRODUCTION CIRCUIT WITH REPRODUCTION SPEED DEPENDENT VFO

BACKGROUND OF THE INVENTION

1. Field of the Invention

The present invention relates to a signal processing circuit of a disc reproduction apparatus such as a disc player for reproducing digital audio discs referred to as compact discs (CDs) or MiniDiscs (MDs) and other information recording discs (hereinafter simply referred to as discs).

2. Description of the Related Art

In digital audio discs, for example, CD types of discs, use is being made of the modulation system referred to as a "eight to fourteen modulation" (EFM). When demodulating this EFM signal, a clock (hereinafter simply referred to as a reproduction clock) is generated based on a binary pulse train signal obtained by waveform-shaping a RF signal read from the disc. The demodulation is carried out by using this reproduction clock. To generate this reproduction clock, generally a phase locked loop (PLL) circuit has been used.

It has also been required that this PLL circuit be able to be used in a frequency bandwidth with a wide oscillation frequency.

For example, the CD-ROM market is moving in the direction of higher speed reproduction. The signal processing large-scale integrated circuits (LSIs) (for example, digital signal processors) used for CD-ROMs are being required to be capable of super-high speed n-multiple speed for realizing higher speed reproduction than standard one speed, for example, up to 16× speed or 24× speed. In the signal processing LSIs for CD-ROMs, in order to obtain the required oscillation frequency, it is necessary to include a high voltage-controlled oscillator (VCO) for the maximum oscillation frequency.

Figure 1:
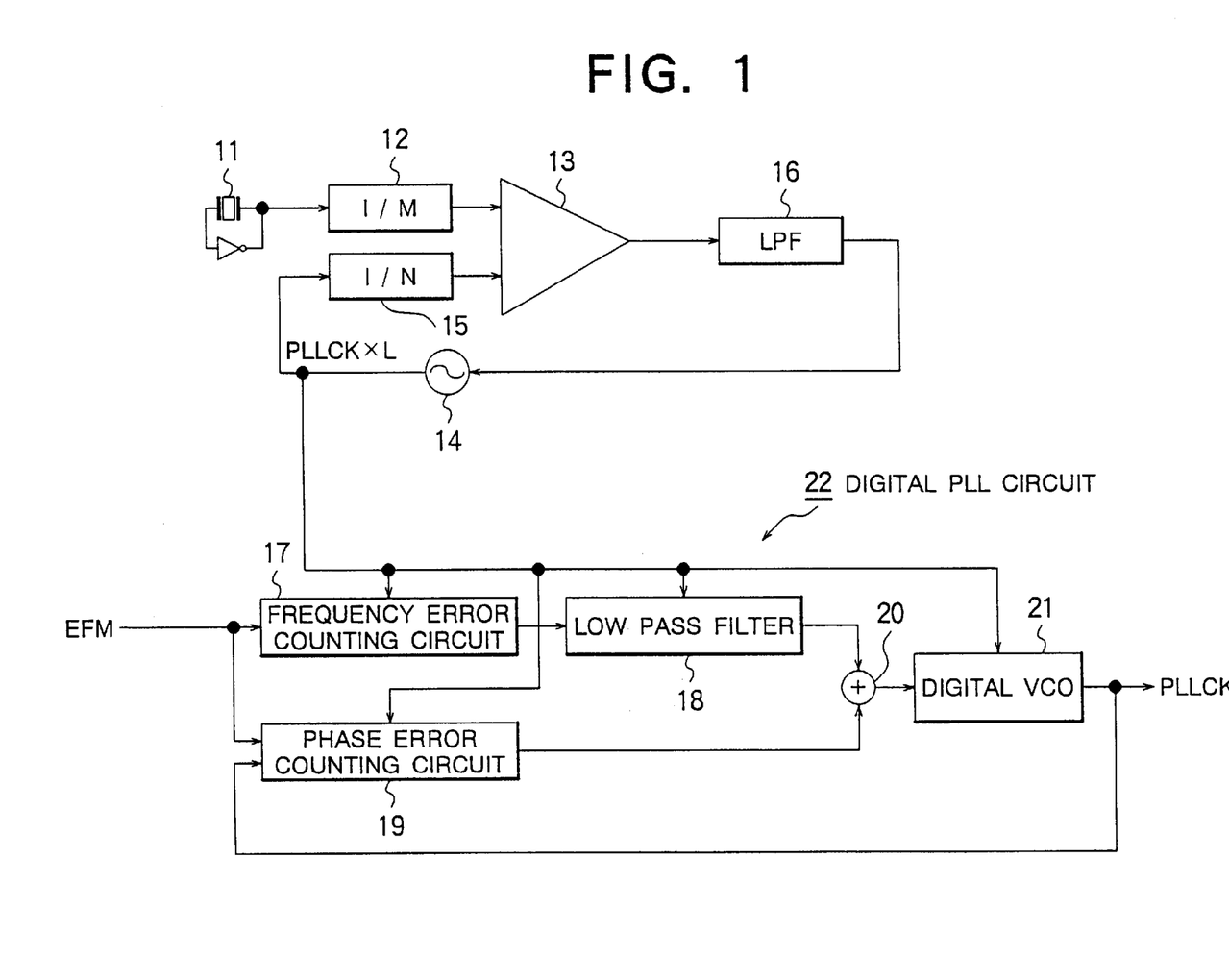
FIG. 1 is a block diagram of PLL circuit of a disc player showing a first related art.

FIG. 1 is a block diagram of an example of the basic configuration of a PLL circuit used for the generation of a reproduction clock.

In FIG. 1, the oscillation frequency of a crystal oscillator 11 (for example, 16.9344 MHz) is divided by M (M is an integer) at a prescaler 12 and becomes one input of a phase comparator 13. The phase comparator 13 receives as another input a frequency signal obtained by dividing the oscillation frequency of the VCO 14 by N (N is an integer) at a prescaler 15, compares the phases of the two frequency signals, and outputs a phase difference signal thereof. This phase difference signal passes through a low pass filter (LPF) 16 and becomes the control voltage of the VCO 14. The VCO 14 changes in its oscillation frequency in accordance with this control voltage. The oscillation output of this VCO 14 is derived as a reference clock of L (integer) times the finally obtained reproduction clock PLLCK and, at the same time, becomes the other input of the phase comparator 13 through the prescaler 15.

In this circuit configuration, the circuit operates so that phases of the two input signals of the phase comparator 13 coincide. As a result, the frequencies of two input signals will also coincide.

Note that, the oscillation frequency 16.9344 MHz of the crystal oscillator 11 becomes 384×fs where a sampling frequency fs is set to the same frequency as that of the CD system, that is, 44.1 kHz.

Further, when setting the frequency of the reproduction clock PLLCK at 4.3218 MHz, the 4.3218 MHz is the channel clock frequency at the time of PWM modulation of the EFM signal by the CD method. The EFM signal is PWM modulated in a 1 period step from the 3 periods to 11 periods.

A reference clock having a frequency L times the channel clock is given to a digital PLL circuit 22. The digital PLL circuit 22 is comprised of a frequency error counting circuit 17, a low pass filter 18, a phase error counting circuit 19, an adder 20, and a digital VCO 21. It is configured to generate a reproduction clock PLLCK based on the reference clock, detects the frequency error and phase error of the EFM signal with respect to the reproduction clock PLLCK, and controls the frequency and phase of the reproduction clock PLLCK based on this frequency error and phase error.

Here, an EFM signal is a signal obtained by waveform shaping and converting to a binary format the RF signal read from the disc. This binary signal changes by nT (where, n is an integer from 3 to 11) when the period of the channel clock is T.

This digital PLL circuit 22 has a ±5% capture range with respect to the reference frequencies of the different speeds.

Figure 2:
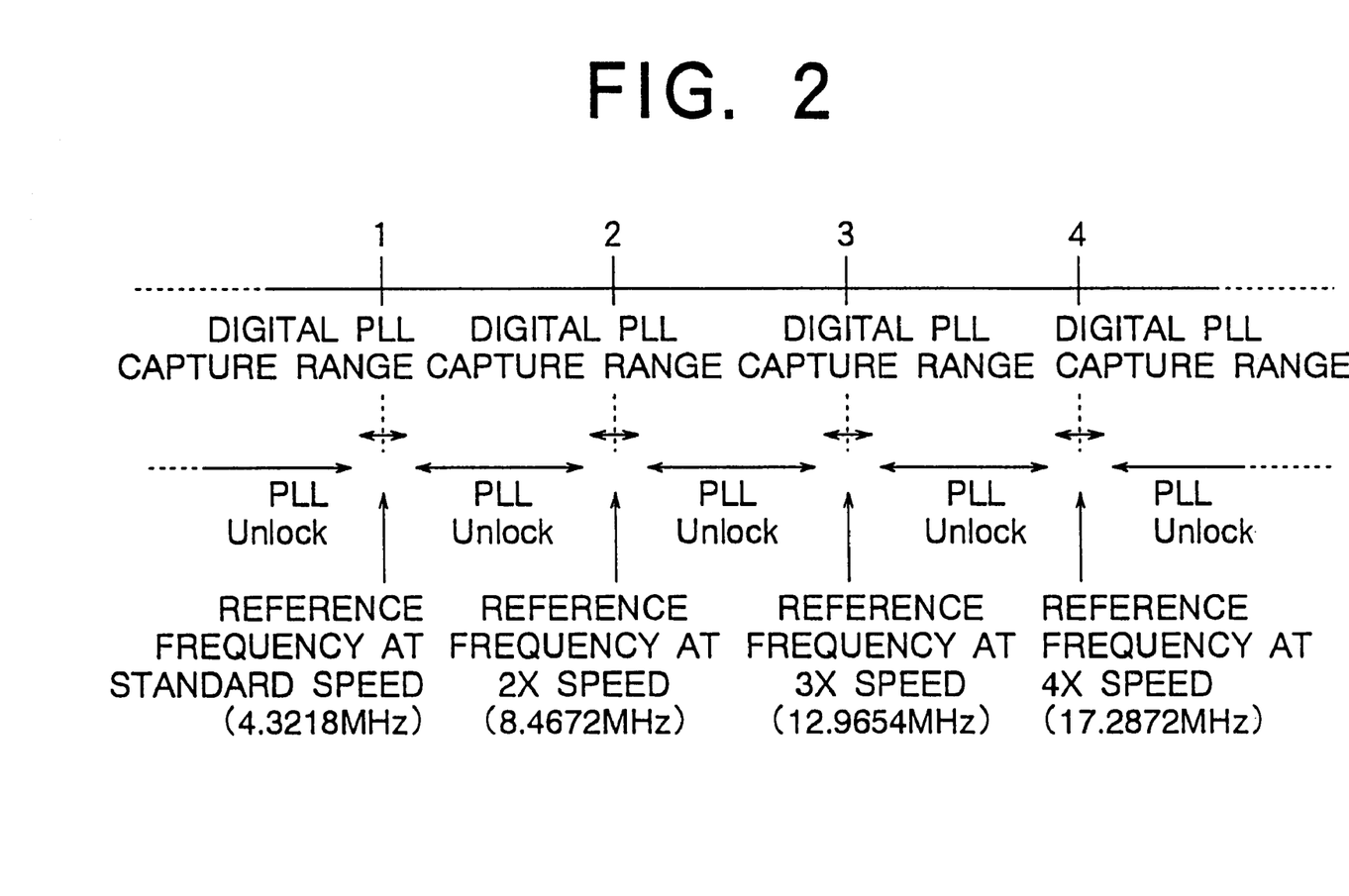
FIG. 2 is a view explaining a capture range at the standard, 2×, 3×, and 4× speeds of a digital PLL circuit of the circuit of FIG. 1.

FIG. 2 is a view of the capture range at the time of different operating speeds, that is, standard speed, 2× speed, 3× speed, and 4× speed, of the digital PLL circuit 22.

Here, for example, considered by the reproduction clock PLLCK for measuring the period of the RF signal read from the disc (at the time of standard speed, 4.3218 MHz), the capture range of the digital PLL circuit is given by the following relation:

$$4.3218 \text{ MHz} \times 0.95 \leq \text{PLLCK} \leq 4.3218 \text{ MHz} \times 1.05 \tag{1}$$

Therefore, with the above configuration, when the speed of the disc is out of the above range, PLL was not locked and it was necessary to wait until the ±5% range was entered.

Namely, as shown in FIG. 2, the PLL is locked within a range of ±5% from the fixed reference frequency, for example, at 4.3218 MHz ±5% at standard speed, at 8.6438 MHz ±5% at 2× speed, and at 17.2872 MHz ±5% at 4× speed, and is not locked in ranges other than this (in the figure, the range indicated by PLL Unlock).

In the circuit of FIG. 1 having such a characteristic, in a state where for example a CD player is being used outdoors, when the player is rotated in a rotation direction or an inverse rotation direction of the disc, the rotational speed of the spindle will deviate by a large amount from the target speed due to the large deviation of the relative speed with respect to the pick-up due to the inertia of the rotational movement and will no longer be in the capture/lock range ±f. Therefore, there were disadvantages such as a susceptibility to rotary outer disturbances, for example, unlocking of the PLL and cessation of the music, and difficulty of high speed access.

Therefore, the assignee previously proposed a signal processing circuit in which the reference frequency was made to track the rotational speed of the disc (Japanese Patent Application No. 6-291459).

Figure 3:
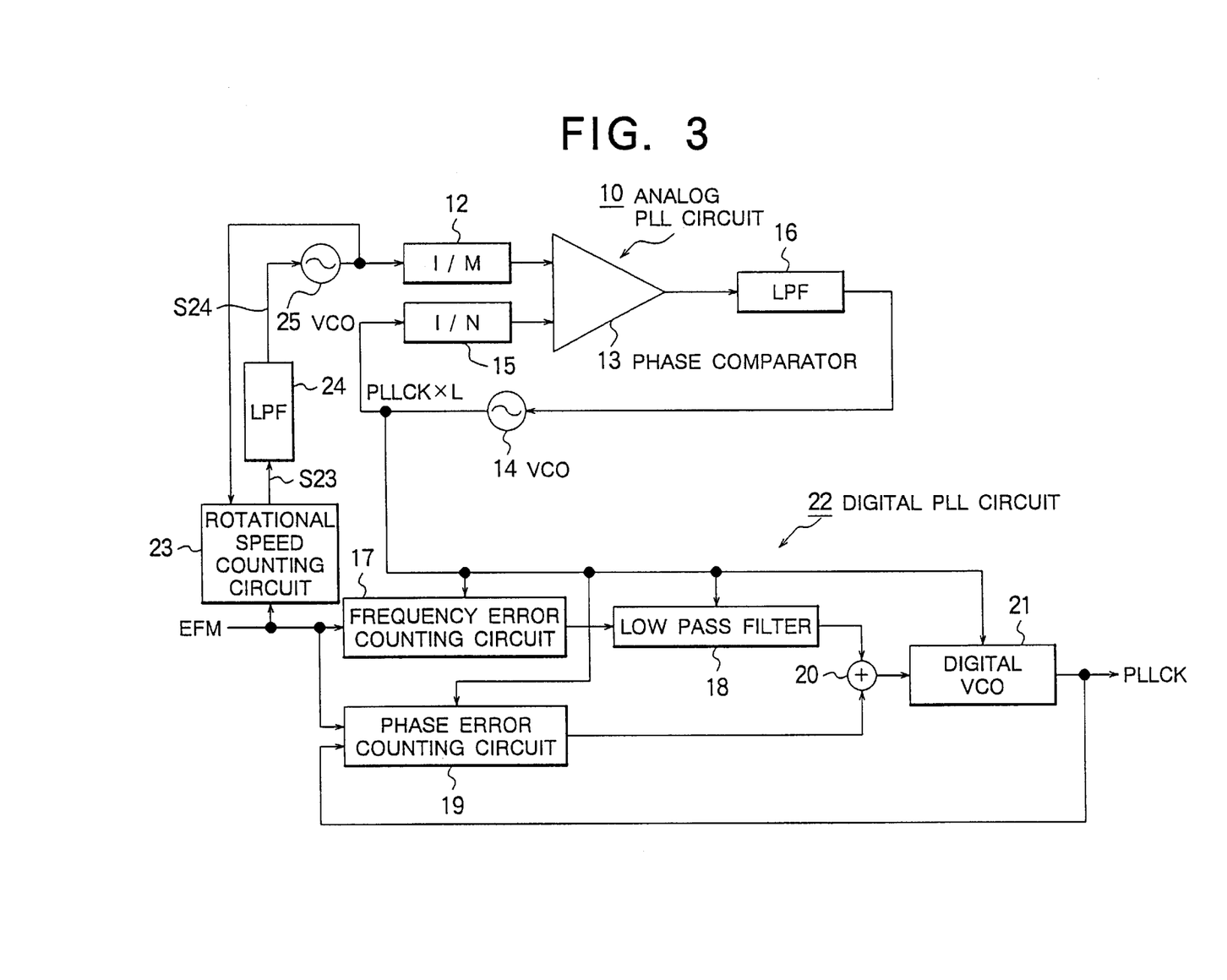
FIG. 3 is a block diagram of the PLL circuit of a disc player showing a second related art.

In this circuit, as shown in FIG. 3, the rotational speed of the spindle motor is detected based on the EFM signal at a rotational speed counting circuit 23, a control signal for making a speed error with respect to the reference speed zero is generated, and the control signal is processed to cut its high frequency component at a low pass filter 24 and supplied to a VCO 25 as the control voltage thereof. The VCO 25 is used as a means for giving the reference frequency to an analog PLL circuit 10. A control voltage in accordance with the speed error with respect to the reference speed of the rotational speed of the spindle is given to this VCO 25, while a reference clock PLLCK×L is generated at the analog PLL circuit 10 based on the oscillation frequency given by this VCO 25. At the same time, a reproduction clock PLLCK is generated at a digital PLL circuit 22 based on this reference clock.

In this circuit, both of the VCO 25 and the VCO 14 in the analog PLL circuit 10 change in their oscillation frequencies in proportion to the rotational speed of the spindle. Namely, the slower the rotation, the lower the reference frequency, while the faster the rotation, the higher the reference frequency.

Figure 4:
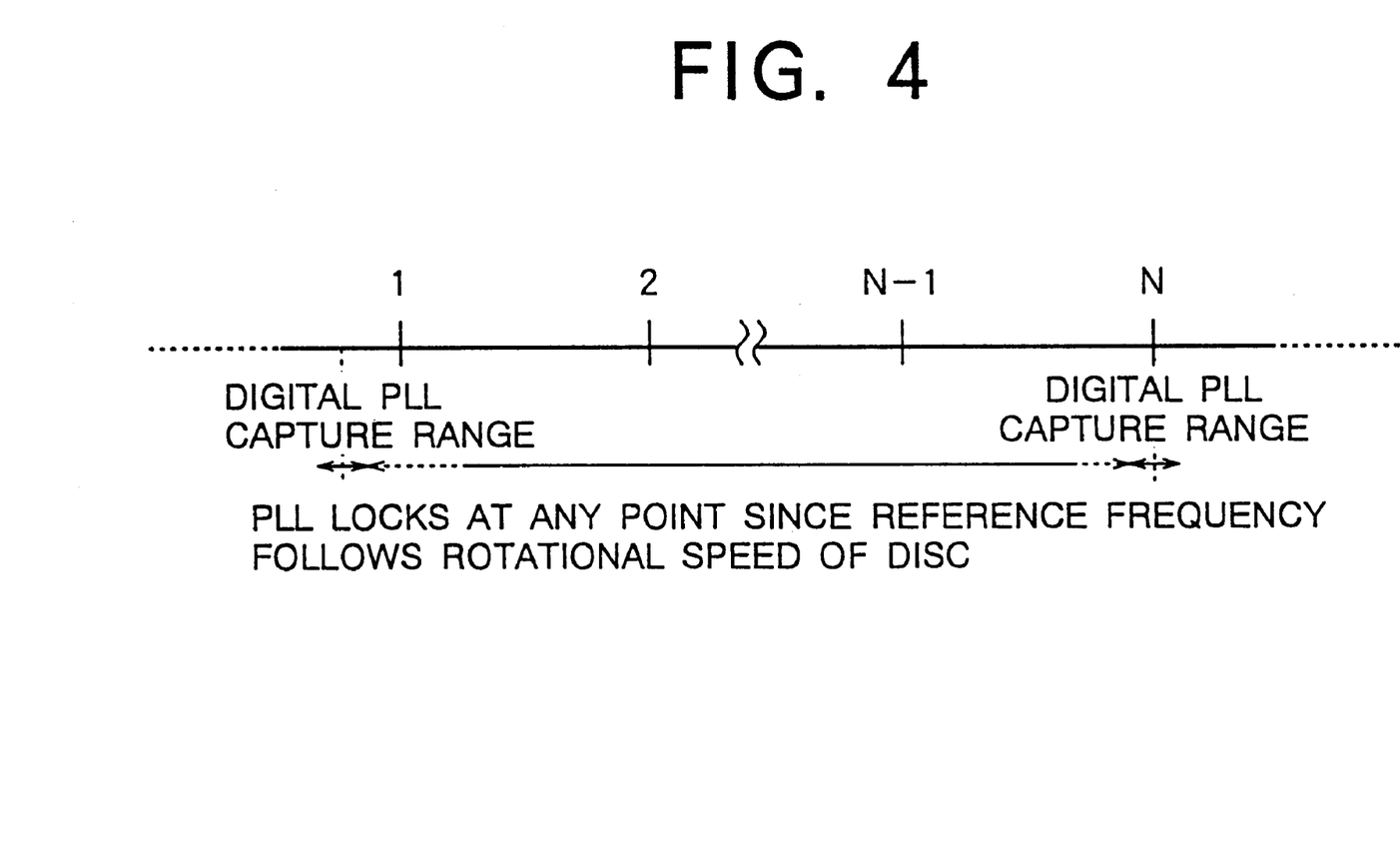
FIG. 4 is a view explaining the capture range of a digital PLL circuit of the circuit of FIG. 3.

Since the reference frequency tracks the rotational speed in this way and the digital PLL circuit 22 has a capture range of ±5% with respect to the reference frequency, as shown in FIG. 4, a PLL circuit with a very wide capture range as a whole can be realized and it became possible to track any rotational speed.

As a result, when for example a disc player is being used outdoors, even in a case when the rotational speed of the spindle deviates by a large amount from the target value, for example, a case where the player is rotated in the rotation direction or reverse rotation direction of the disc and a case where a large track jump occurs at the time of access, the lock of the PLL is almost never lost, therefore there are the advantages that the data can be always read and, at the same time, high speed access becomes possible.

Figure 5:
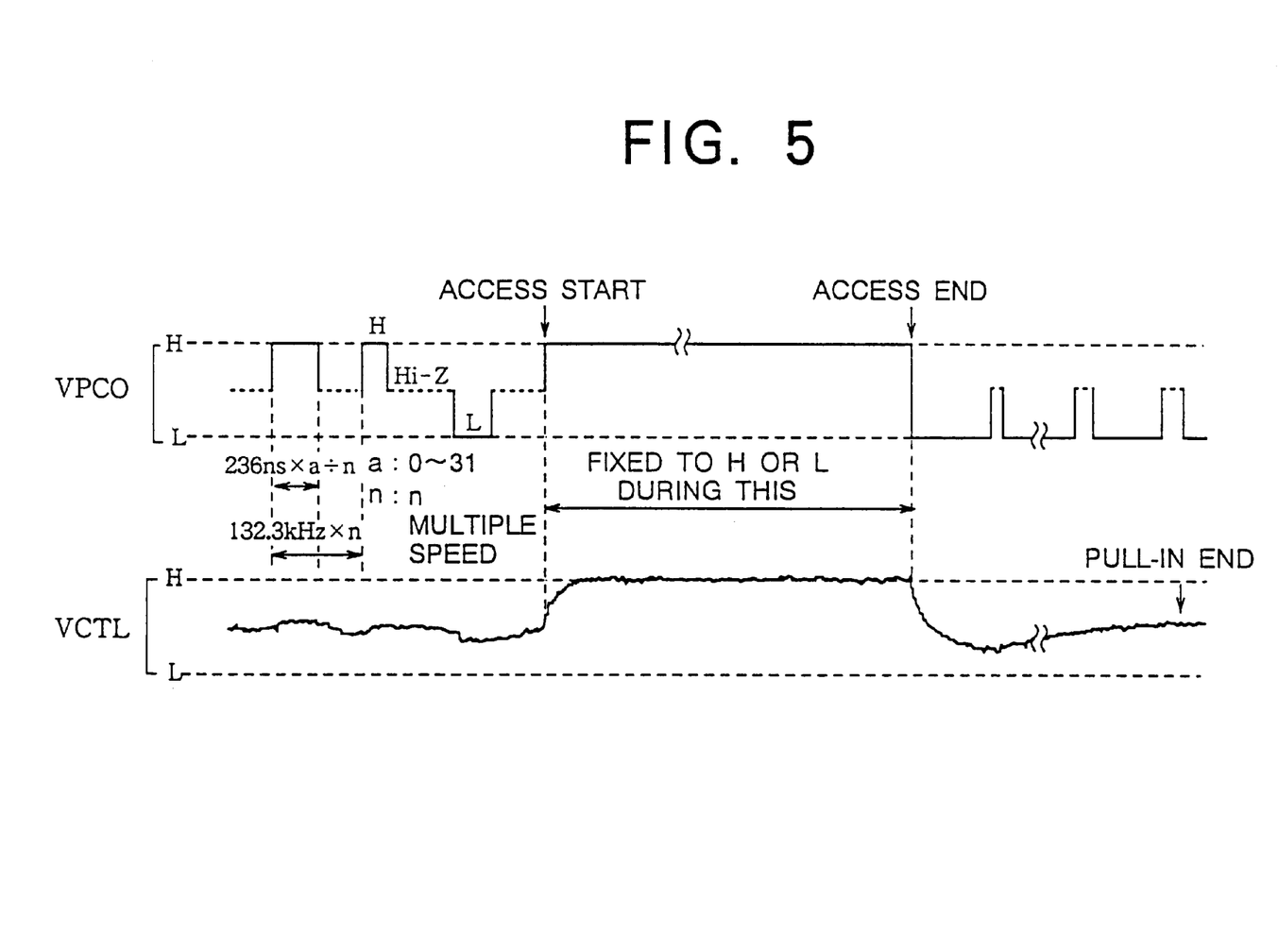
FIG. 5 is a view of a state of output signals of a rotational speed counting circuit and a low pass filter at the time of access of the circuit of FIG. 3.

In a circuit adopting the so-called wide capture system of FIG. 3, however, once the PLL is lost at the time of access or the like, as shown in FIG. 5, an output signal S23 of the rotational speed counting circuit 23 for controlling the VCO 25 becomes a signal having no meaning of the high level (H) or the low level (L).

For this reason, the waveform of the output signal S24 of the latter stage LPF 24 becomes fixed to the high level or low level after passing a transition period.

This signal S24 is the control voltage of the VCO 25, but when this control voltage becomes fixed at a high level or low level, the oscillation frequency of the VCO 25 becomes minimum or maximum.

In the circuit of FIG. 3, this oscillation clock becomes an internal master clock, a PLL pull-in operation is started from a position far away from the desired oscillation frequency.

On the other hand, in addition, since the time constant of the LPF 24 used here is large, as shown in FIG. 5, a long time of an ms order was necessary for the oscillation frequency of the VCO 25 to reach the desired value.

Namely, a long time was taken from when the pick-up landed at the target track to when the PLL pull-in was terminated and locked.

In order to solve this problem, the configuration was adopted of controlling the oscillation frequency of the VCO of the rotation tracking PLL circuit by injecting a pulse from a microcomputer or the like during a traverse, but the change of characteristic of the VCO due to a solid difference of the LSI and the environment of use is large, so it has been difficult to indiscriminately control this.

SUMMARY OF THE INVENTION

An object of the present invention is to provide a signal processing circuit of a disc reproduction apparatus which is not only strong against rotary outer disturbances and high speed access, but is also able to improve the access time.

To attain the above object, the present invention is a signal processing circuit of a disc reproduction device for generating a reproduction clock synchronized with a reproduction signal from the disc and performing signal processing with respect to the reproduction signal based on this reproduction clock, having a rotational speed counting means for detecting a rotational speed of a spindle based on the reproduction signal and generating a first control signal in accordance with a speed error with respect to a reference speed; a first oscillating means for generating a first reference clock of a predetermined frequency; a second oscillating means changing in its oscillation frequency in accordance with the first or second control signal; a phase comparing means for detecting a phase difference between the first reference clock by the first oscillating means and the oscillation signal of the second oscillating means and generating the second control signal in accordance with the result of detection; a first PLL circuit for generating a second reference clock of a predetermined frequency based on the oscillation frequency of the second oscillating means; a second PLL circuit for generating a reproduction clock based on the second reference clock, detecting a frequency error and phase error of the reproduction signal with respect to this reproduction clock, and controlling the frequency and phase of the reproduction clock in accordance with the frequency error and phase error thereof; and a control signal switching means for inputting the first control signal by the rotational speed counting means to the second oscillating means at the time of reproduction and inputting the second control signal by the phase comparing means to the second oscillating means at the time of access.

Further, in the present invention, the controlling means has a switch means for performing the switching of a connection of the second oscillating means with the output line of the first control signal by said rotational speed counting means or the phase comparing means based on a third control signal and a controlling means for outputting the third control signal in accordance with the reproduction or access operation mode.

Further, in the present invention, provision is made of a frequency dividing means for dividing the frequency of the oscillation output of the second oscillating means by a variable frequency division ratio and inputting the same to the phase comparing means; and the controlling means sets at least the frequency division ratio of the frequency dividing means at the time of access.

The controlling means predicts a reproduction speed at the destination of access based on access information and sets the frequency division ratio of the frequency dividing means in accordance with the predicted speed.

Also, in the present invention, the switch means inverts the output signal of the phase comparing means at the time of access and inputs the same to the second oscillating means.

Further, provision is made of a low pass filter set to a predetermined time constant between the control signal switching means and the second oscillating means.

According to the signal processing circuit of the present invention, the rotational speed counting means detects the rotational speed of the spindle based on the reproduction signal from the disc and gives a first control signal that makes the speed error with respect to the reference speed zero to the second oscillating means, for example, the VCO, as the control voltage thereof. By this, the second oscillating means changes in its oscillation frequency in proportion to the rotational speed of the disc. The oscillation frequency of this second oscillating means becomes the reference frequency of the first PLL circuit. The first PLL circuit generates the reference clock based on this reference frequency and generates the reproduction clock while controlling the frequency and phase based on this reference clock.

On the other hand, at the time of access, the control signal to the second oscillating means is switched from the first control signal to the second control signal by the phase comparing means by the switch means under the control of for example the controlling means.

Namely, at the time of access, a multiple PLL circuit is constituted by the first and second oscillating means and the phase comparing means or these plus the variable frequency dividing means and LPF.

By this, the oscillation frequency of the second oscillating means tracks the reproduction speed at the destination of access predicted based on the access information by for example the controlling means.

Accordingly, the PLL pull-in time after the arrival (landing) at the target track is reduced.

BRIEF DESCRIPTION OF THE DRAWINGS

These and other objects and features of the present invention will become clearer from the following description of the preferred embodiments given with reference to the attached drawings, in which.

DESCRIPTION OF THE PREFERRED EMBODIMENTS

Below, a detailed explanation will be made of an embodiment of the present invention applied to, for example, a CD player by referring to the drawings. Note that the present invention is not limited to application to a CD player and can be generally applied to all disc players such as MD players.

Figure 6:
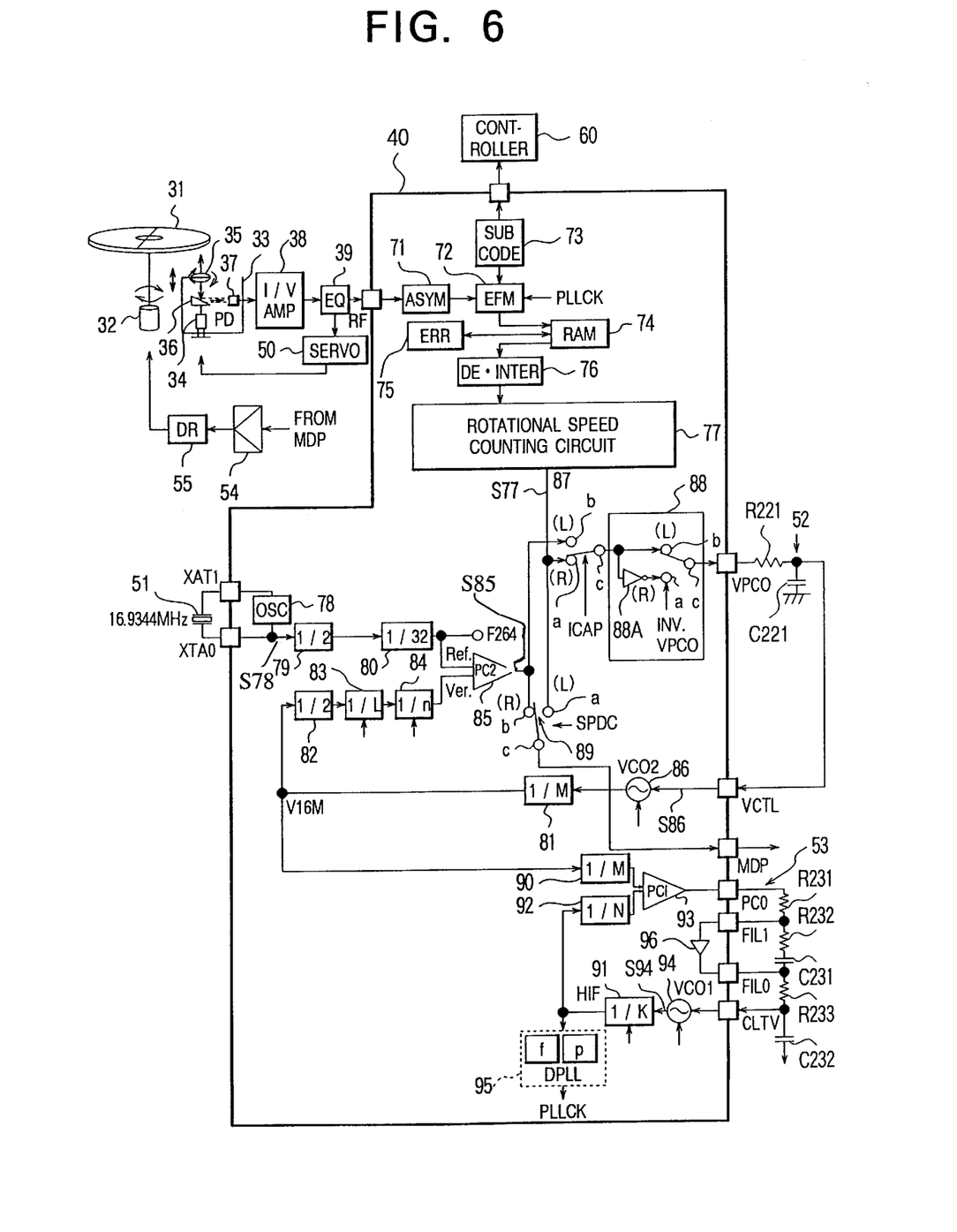
FIG. 6 is a block diagram of the configuration of a control system of a CD player according to a first embodiment of the present invention.

FIG. 6 is a block diagram of the configuration of an embodiment of the control system of a CD player to which the present invention is applied.

The CD player of FIG. 6 is constituted by a disc (CD) 31, a spindle motor 32, an optical pick-up (hereinafter, simply referred to as a pick-up) 33, an I (current)/V (voltage) amplifier 38, an RF equalization circuit 39, a digital signal processor (DSP) circuit 40, an optical system servo signal processing circuit 50, a crystal oscillator 51, low pass filters (LPFs) 52 and 53, an amplifier 54, a driver 55, and a controller 60.

In FIG. 6, the disc (CD) 31 is driven to rotate by the spindle motor 32 and the recorded information thereof is read by the optical system pick-up 33.

The pick-up 33 is constituted by a laser diode 34, an object lens 35 which focuses the laser beam emitted from this laser diode 34 onto the signal recording surface of the disc 31 as a light spot for reading information, a polarization beam splitter 36 for changing the direction of advance of the reflected light beam from the disc 31, a photodetector 37 for receiving this reflected light beam, and so forth. It is provided so that it can freely move in the disc radial direction by using a sled feed motor (not illustrated) as a driving source.

In the pick-up 33, although not illustrated, a tracking actuator for moving the information reading light spot with respect to the recording tracks of the disc 31 in the disc radial direction and a focus actuator for moving the object lens 35 in the light axis direction are further included.

The output signal of this pick-up 33 is converted from a current signal to a voltage signal at the I/V amplifier 38, further waveform shaped at the RF equalization circuit 39, and then supplied to the DSP circuit 40.

The DSP circuit 40 is constituted by a PLL asymmetry correction circuit 71, an EFM demodulation circuit 72, a sub code demodulation circuit 73, a random access memory (RAM) 74, an error correction circuit 75, a deinterleave circuit 76, a rotational speed counting circuit 77, an oscillator (OSC) 78, prescalers 79, 80, 81, 82, 83, 84, 90, 91, and 92, phase comparators 85 (PC2) and 93 (PC1), VCOs 86 and 94, switch circuits 87, 88, and 89, and a digital PLL circuit 95 as the second PLL circuit.

Further, the first PLL circuit is constituted by the phase comparator 93 (PC1), VCO 94, LPF 53, and prescalers 90 and 92.

The PLL asymmetry correction circuit 71 corrects the asymmetry to obtain a binary EFM signal. Here, "asymmetry" means the state where the center of the eye pattern of the RF signal deviates from the center of the amplitude. The PLL asymmetry correction circuit 71 includes a PLL circuit for generating a reproduction clock PLLCK based on the binary signal edge.

The EFM demodulation circuit 72 demodulates the EFM signal obtained at the PLL asymmetry correction circuit 71. The data after the EFM demodulation is supplied to the sub code processing circuit 73 and, at the same time, stored in the RAM 74.

The sub code processing circuit 73 demodulates the sub code as the time information put just behind the frame synchronization signal and supplies this to the controller 60.

The error correction circuit 75 corrects the error of the data after EFM demodulation stored in the RAM 74 based on the error correction and detection parity.

The deinterleave circuit 76 deinterleaves the data stored in the RAM 74, and, supplies the same to the rotational speed counting circuit 77.

The rotational speed counting circuit 77 detects the rotational speed of the spindle motor 32 (hereinafter, simply referred to as a spindle) based on the EFM signal, generates a control signal (second control signal) for making the speed error with respect to the reference speed zero, and outputs the same to the switch circuits 87 and 89.

The oscillator 78 generates a clock signal (first reference clock) S78 based on the high precision oscillation output gf the crystal oscillator 51 (frequency: 16.9344 MHz).

The prescaler 79 divides the frequency of the clock signal S78 of the oscillator 78 by 2.

The prescaler 80 further divides the frequency of the clock signal S78 of the oscillator 78 divided at the prescaler 79 by 2 by 32 and supplies the same to a phase comparator 85.

The prescaler 87 divides the frequency of the output signal (second reference clock) S86 of the VCO 86 by K based on the integer K (for example 1, 2, 4, and 8) set according to the instructions of the control signals KSL0 and KSL1 from the controller 60 and supplies the same to the prescalers 87 and 90.

The prescaler 82 further divides the frequency of the output signal S86 of the VCO 86 divided by K at the prescaler 81 by 2.

The prescaler 83 divides the frequency of the signal divided at the prescaler 82 by 2 by L based on the integer L (for example, 1, 2, 3, and 4) set according to the instructions of the control signals VPCTL0 and VPCTL1 from the controller 60.

The prescaler 84 divides the frequency of the signal divided by L at the prescaler 83 by n based on the integer L (for example 1 to 256) set according to the instructions of the control signals VPCTL0 and VPCTL1 set by the eight bits of control signals VP0 to VP7 from the controller 60 and supplies the same to the phase comparator 85.

The phase comparator 85 uses the signal obtained by dividing the frequency of the output signal S78 of the oscillator 78 by 64 as the input on the reference side (Ref) and the oscillation frequency of the VCO 86, $1/K \times 1/2 \times 1/L \times 1/n$, as the input on the variable side (Var), compares the phases of the frequency signals of the two input signals, and outputs a phase difference signal (second control signal) S85 thereof to the switch circuits 87 and 89.

The phase difference signal S85 is output as a high level (H) when the frequency on the variable side is low with respect to the reference side, is output as a low level (L) when the frequency on the variable side is high with respect to the reference side, and is output as a high impedance (HiZ) where they are equal.

The VCO 86 receives the output signal S77 of the rotational speed counting circuit 77 or the output signal S85 of the phase comparator 85 obtained by cutting the high frequency component at an externally attached LPF 52 comprising a resistor element R221 and a capacitor C221 connected between the terminals VPCO and VCTL as the control voltage and oscillates at the frequency in accordance with the control voltage.

The oscillation frequency of this VCO 86 tracks the rotational speed of the disc 31 at the time of a normal operation other than a traverse and tracks the frequency of the landing position (target track) of the pick-up 33, in other words, the reproduction speed predicted in advance at the target track, under the control of the controller 60 mentioned later at the time of a traverse.

The switch circuit 87 has two input terminals a and b and one output terminal c. The input terminal a is connected to the output line of the signal S77 of the rotational speed counting circuit 77, the input terminal b is connected to the output line of the signal S85 of the phase comparator 85, the input terminal a is connected to the output terminal c when the control signal ICAP from the controller 60 is at a high level (at the time of a normal operation other than a traverse), and the input terminal b is connected to the output terminal c when the control signal ICAP from the controller 60 is at a low level (at the time of a traverse). Note that the output terminal c is connected to the switch circuit 88.

The switch circuit 88 has two input terminals a and b and one output terminal c. The input terminal a is connected to the output terminal c of the switch circuit 87 via an inversion circuit 88A, the input terminal b is directly connected to the output terminal c of the switch circuit 87, the input terminal b is connected to the output terminal c when the control signal INV.VPCO from the controller 60 is at the low level (at the time of a normal operation other than a traverse), and the input terminal a is connected to the output terminal c when the control signal INV.VPCO from the controller 60 is at a high level (at the time of a traverse). Note that the output terminal c is connected to the external terminal VPCO.

The switch circuit 89 has two input terminals a and b and one output terminal c. The input terminal a is connected to the output line of the signal S77 of the rotational speed counting circuit 77, the input terminal b is connected to the output line of the signal S85 of the phase comparator 85, and the connection state with the output terminal c is switched by the control signal SPDC from the controller 60. Usually, however, the control signal SPDC is supplied at a low level and connects the input terminal b to the output terminal c. Note that the output terminal c is connected to the input terminal of the amplifier 54 via the external terminal MDP.

The prescaler 90 further divides the frequency of the output signal S86 of the VCO 86 divided in frequency by K at the prescaler 81 by M.

The prescaler 91 divides the frequency of the output signal S94 of the VCO 94 by K based on the integer K (for example 1, 2, 4, and 8) set according to the instruction of the control signals KSL2 and KSL3 from the controller 60 and supplies the same to the prescaler 92 and the digital PLL circuit 95.

The prescaler 92 further divides the frequency of the output signal S94 of the VCO 94 divided in frequency by K at the prescaler 91 by N.

The phase comparator 93 uses the signal obtained by dividing the frequency of the output signal S86 of the VCO 86 by K and M as the input on the reference side (Ref) and the signal obtained by dividing the frequency of the oscillation frequency of the VCO 94 by K and N as the input on the variable side (Var), compares the phases of the frequency signals of the two input signals, and outputs the phase difference signal S93 thereof to the externally attached LPF 53 via the external terminal PCO.

The VCO 94 receives the output signal S93 of the phase comparator 93 obtained by cutting the high frequency component at the LPF 53 as the control voltage and oscillates at the frequency in accordance with the control voltage.

Note that the LPF 53 is constituted by externally attached resistor elements R231 to R233 and capacitors C231 and C232 and an active filter provided with an operational amplifier 96 inside the DPS circuit 40.

In the above configuration, at the time of a normal operation other than a traverse, the output signal S77 of the rotational speed counting circuit 77 passes through the switch circuits 87 and 88 under the control of the controller 60, is cut in its high frequency component at the LPF 52, and supplied as the control voltage to the VCO 86. The output signal S86 of this VCO 86 is supplied to an analog PLL circuit constituted by prescalers 81, 90, and 91, phase comparator 93, LPF 53, and the VCO 94, and the output signal of the prescaler 91 is supplied to the digital PLL circuit 95.

Namely, at the time of a normal operation other than a traverse, a circuit equivalent to the circuit using the wide capture system shown in FIG. 3 is constituted.

Note that the digital PLL circuit 95 is constituted in the same way as the circuit 22 shown in FIG. 3, therefore a detailed explanation is omitted here.

As opposed to this, at the time of a traverse, under the control of the controller 60, the output signal S85 of the phase comparator 85 passes through the switch circuits 87 and 88, is cut in its high frequency component at the LPF 52, and is supplied as the control voltage to the VCO 86.

Figure 7:
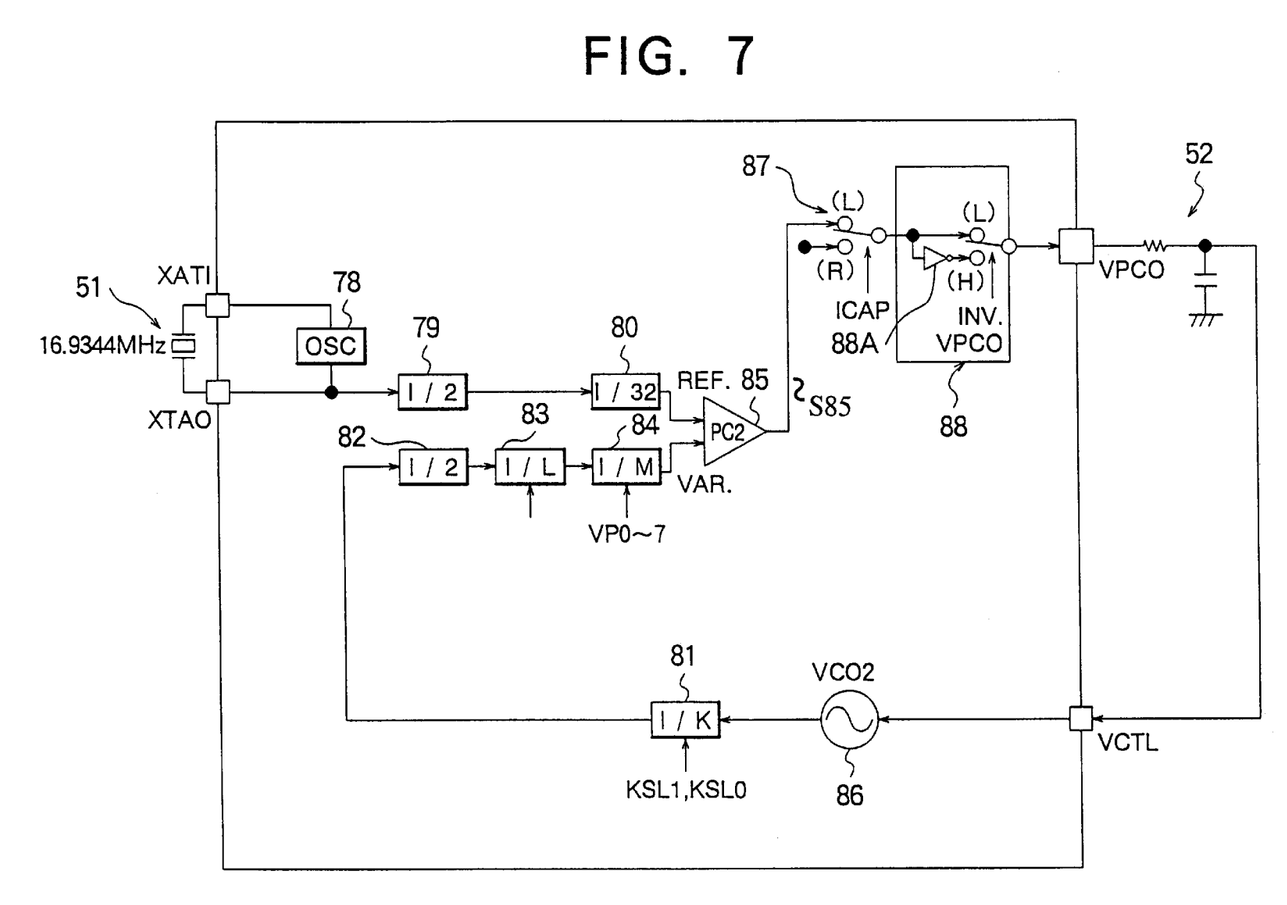
FIG. 7 is a view of a multiple PLL circuit configured at the time of access.

Namely, at the time of a traverse, a completely independent multiple analog PLL circuit constituted by the oscillator 78, prescalers 81 to 84, phase comparator 85, switch circuits 87 and 88, LPF 52, and VCO 86 is constituted as shown in FIG. 7.

Then, by this multiple analog PLL circuit, the oscillation frequency of the VCO 86 is controlled so that the frequency-divided values of the prescalers 83 and 84 are controlled by the controller 60 and track the frequency of the landing position of the pick-up 33 (reproduction speed of the target track).

Note that, in the multiple analog PLL circuit shown in FIG. 7 constituted at the time of a traverse, the phase difference signal S85 output from the phase comparator 85 is output as a high level (H) when the frequency on the variable side is low with respect to the reference side as mentioned above, is output as a low level (L) when the variable side frequency is high, and is output as a high impedance (HiZ) when they are equal.

At this time, the higher the potential of the external terminal VCTL, the lower the oscillation frequency of the VCO 86, while the lower the potential, the higher the oscillation frequency of the VCO 86.

For this reason, when this is used as a simple multiple analog PLL circuit as shown in FIG. 7, it is necessary to invert the polarity. Therefore, the level of the output signal S85 of the phase comparator 85 is inverted at the inversion circuit 88A by the switch circuit 88 at the time of a traverse at which the control signal INV.VPCO is set to a high level.

Figure 8:
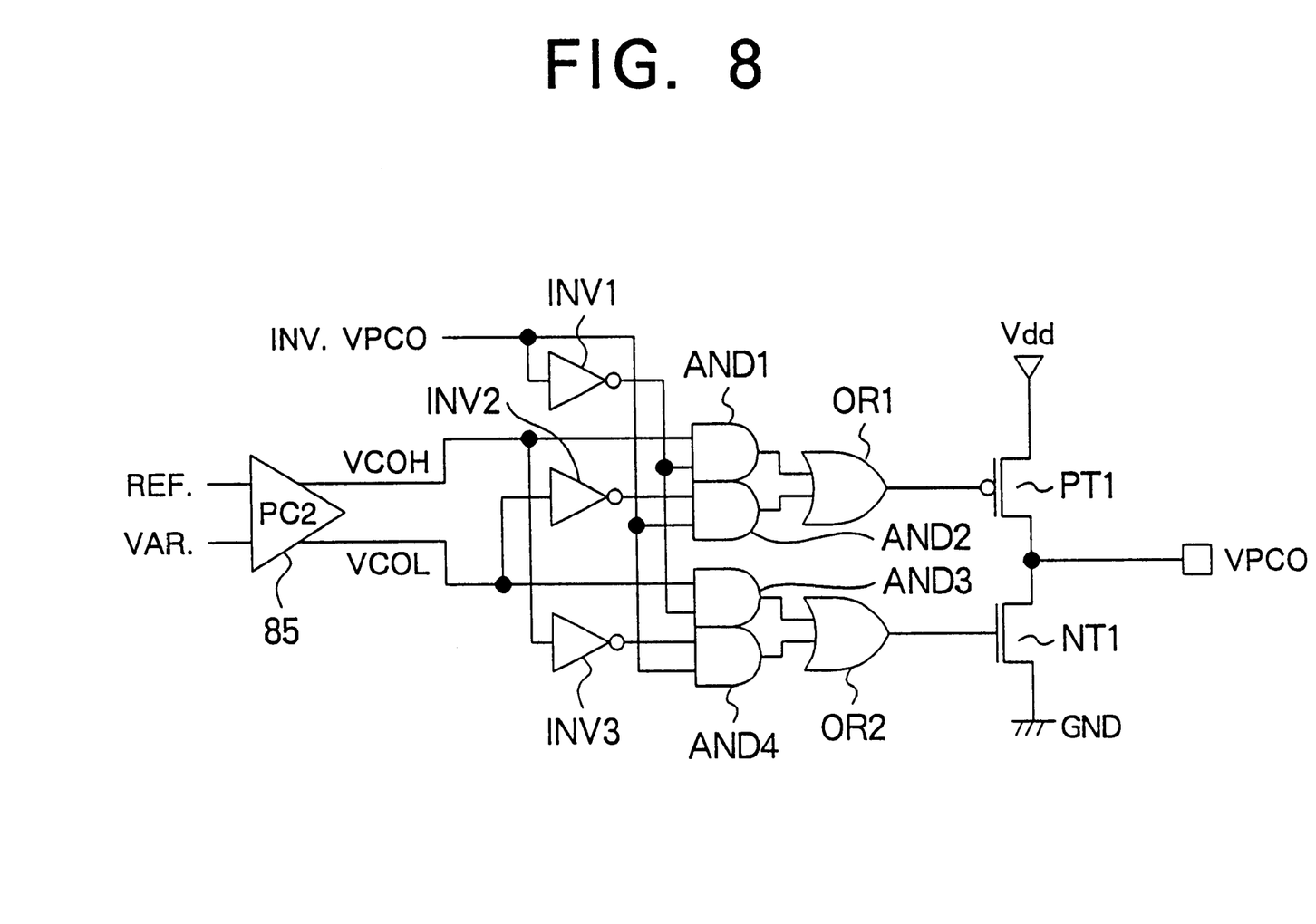
FIG. 8 is a circuit diagram of an example of an inversion circuit in a second embodiment.

In actuality, the output signal S85 of the phase comparator 85 is output as two signals VCOH and VCOL, therefore not a structure of dividing this by a simple inverter, but a circuit structure as shown in for example FIG. 8 is adopted as the switch circuit 88 in the second embodiment of the present invention.

More specifically, as shown in FIG. 8, it is constituted by three inverters INV1 to INV3, four 2-input AND gates AND1 to AND4, two 2-input OR gates OR1 and OR2, a p-channel MOS transistor PT1, and an n-channel MOS transistor NT1.

One input terminal of the AND gate AND1 is connected to the output line of the signal VCOH of the phase comparator 85, while the other input terminal is connected to the input line of the control signal INV.VPCO via the inverter INV1.

One input terminal of the AND gate AND2 is connected to the output line of the signal VCOL of the phase comparator 85 via the inverter INV2, while the other input terminal is connected to the input line of the control signal INV.VPCO.

One input terminal of the AND gate AND3 is connected to the output line of the signal VCOL of the phase comparator 85, while the other input terminal is connected to the input line of the control signal INV.VPCO via the inverter INV1.

One input terminal of the AND gate AND4 is connected to the output line of the signal VCOH of the phase comparator 85 via the inverter INV3, while the other input terminals is connected to the input line of the control signal INV.VPCO.

The output terminals of the AND gates AND1 and AND2 are connected to the input terminal of the OR gate OR1, while the output terminals of the AND gates AND3 and AND4 are connected to the input terminal of the OR gate OR2.

The p-channel MOS transistor PT1 and the n-channel MOS transistor NT1 are connected in series between the supply line of the power supply voltage Vdd and the ground line, the output terminal of the OR gate OR1 is connected to the gate electrode of the p-channel MOS transistor PT1, the output terminal of the OR gate OR2 is connected to the gate electrode of the n-channel MOS transistor NT1, and the connection point of the drains of the p-channel MOS transistor PT1 and the n-channel MOS transistor NT1 is connected to the external terminal VPCO.

Figure 9:
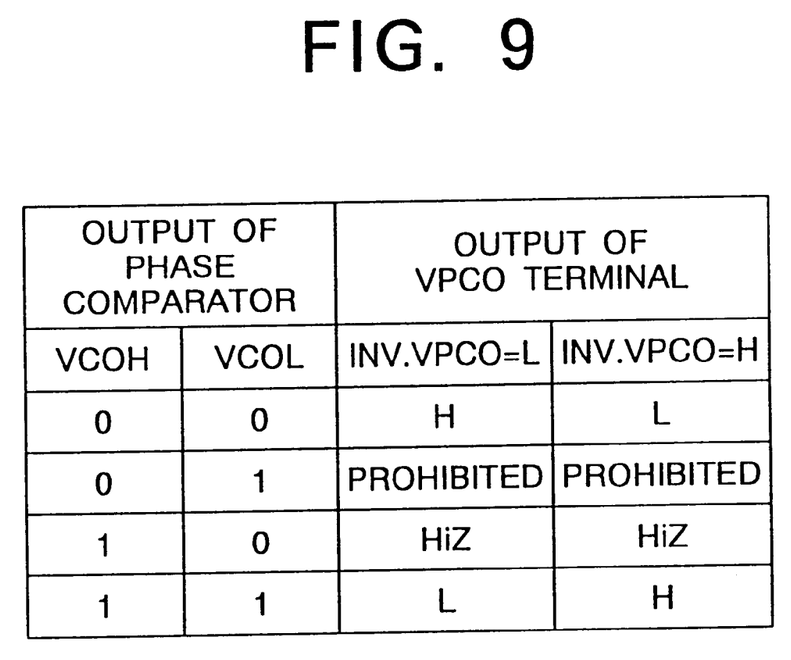
FIG. 9 is a view of an operation mode of the control system of the CD player shown in the second embodiment of the present invention.

FIG. 9 is a view of the relationship between the output signals VCOH and VCOL of the phase comparator 85 and the output state from the external terminal VPCO where the switch circuit 88 having the structure of FIG. 8 is applied.

As shown in FIG. 9, at the time of a traverse when the control signal INV.VPCO is at a high level (H), it becomes a low level (L) when both of the output signals VCOH and VCOL of the phase comparator 85 have a logic "0", becomes an output prohibited state (impossible in actuality) when the signal VCOH has a logic "0" and the signal VCOL has a logic "1"; becomes a high impedance (HiZ) state when the signal VCOH has a logic "1" and the signal VCOL has a logic "0"; and becomes a high level (H) when both of the signals VCOH and VCOL have the logic "1".

Note that the optical system servo signal processing circuit 50 is for controlling the servo systems related to the operation of the pick-up 33, that is, a tracking servo system for making the information reading light spot track the recording track of the disc 31, a focus servo system for focusing the light spot onto the signal recording surface of the disc 31, and a sled servo system for controlling the position of the pick-up 33 in the disc radial direction.

The controller 60 controls the entire system and, receives the sub code as the time information of the sub code processing circuit 73, and outputs the signal ICAP to the switch circuit 87 at a high level at the time of a normal operation other than a traverse as the access operation, outputs the signal INV.VPCO to the switch circuit 88 at a low level, controls the frequency-divided value of the prescalers 81 and 91, and so on.

Further, at the time of a traverse, it outputs the signal ICAP to the switch circuit 87 at a low level, outputs the signal INV.VPCO to the switch circuit 88 at a high level, outputs the control signals VPCTL0 and CPCTL10 for controlling the frequency-divided value to the prescaler 83 with a predetermined value so as to control the oscillation frequency of the VCO 86 to the frequency of the landing position of the pick-up 33, that is, the reproduction speed of the target track in advance during a time traverse based on the sub code, address information ADR, and so forth, and outputs the control signals VP0 to VP7 to the prescaler 84 with a predetermined value.

Below, an explanation will be made of the method of prediction of the oscillation frequency of the VCO 86 in the controller 60 at the time of a traverse.

In recent years, in CD-ROM drivers, the main method of controlling the spindle 32 has been the constant angular velocity (CAV) system.

Where a disc 31 premastered by the constant linear velocity (CLV) system is controlled by the CAV system, the transfer rate of the EFM changes between the inner circumference and outer circumference of the disc 31.

More specifically, it becomes about 2.5 times (point of 74 minutes in absolute time) in the outermost circumference when defining the innermost circumference as 1 (point of 0 minute in absolute time).

The oscillation frequency of the VCO 86 is in proportion to the transfer rate (relative speed) of the EFM, therefore it is possible to predict the reproduction speed after landing of the pick-up 33 according to what position of the disc 31 the destination of access is. It is also possible to convert this to the oscillation frequency of the VCO 86.

Here, when defining the relative speed of the spindle 32 as R, the following relationship stands between the frequency-divided value n (VP0 to VP7) of the prescaler 84 and the frequency-divided value L (VPCTL0, 1) of the prescaler 83 (at time of setting the multiple speed mode).

$$R=[(256-n)/32] \times 2 \times (L+1)$$

$$n=256-[32R/2\ (L+1)] \tag{2}$$

Figure 10:
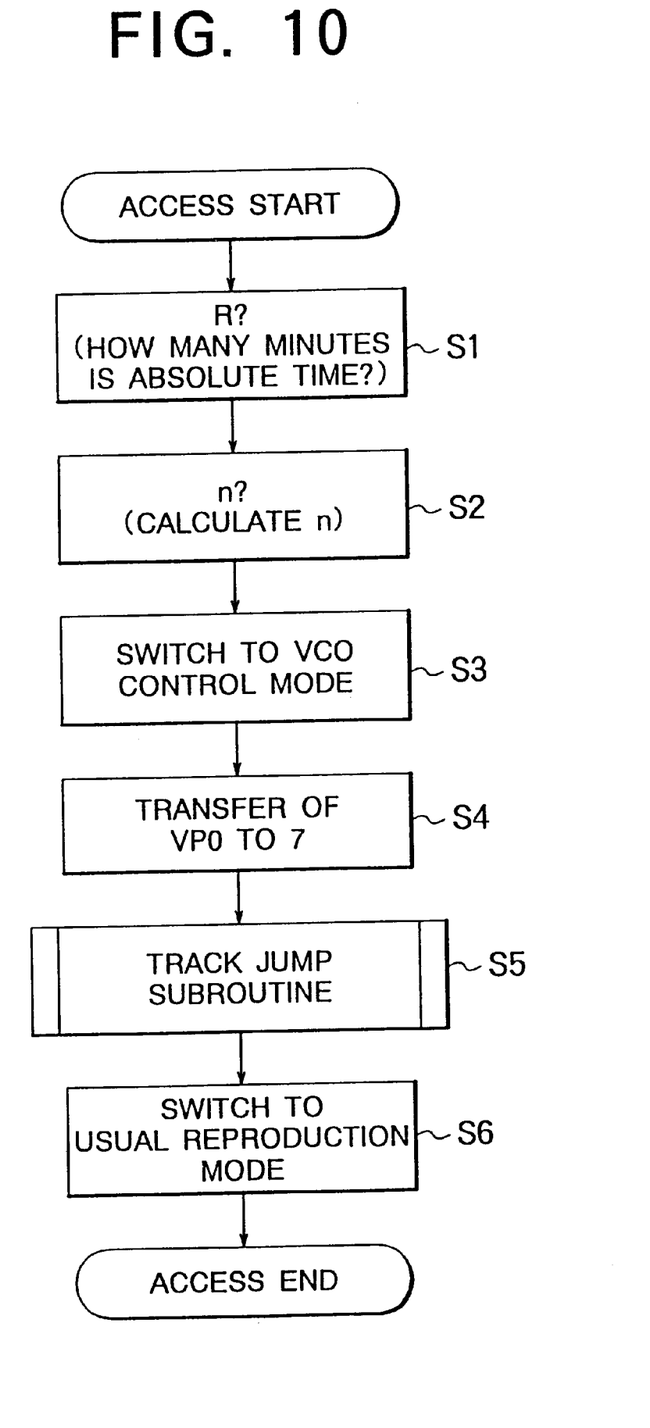
FIG. 10 is a flowchart explaining the control operation of a controller at the time of access as a third embodiment of the present invention.

Next, an explanation will be made of an example of the method of operation of the controller 60 at the time of a traverse (at prediction) as a third embodiment of the present invention by referring to the flowchart of FIG. 10.

Assume now that a certain point of the disc 31 has been reproduced at 10× speed. Here, assume that the access command is input and that the absolute time of the destination of the jump is A minutes.

In this case, first, the controller 60 calculates how what speed (R) the point of the absolute time A minutes becomes (S1). Note that, it is also possible to configure it so that the point is determined arbitrarily by providing a table in place of performing a calculation.

When R can be sought, next, the frequency-divided value n of the prescaler 84 is calculated and the eight bits of the control signals VP0 to VP7 are set in accordance with the calculated value (S2).

Then, the operation mode is switched to the VCO control mode (traverse control mode), the control signal ICAP is output to the switch circuit 87 at a low level, and, at the same time, the control signal INV.VPCO is output to the switch circuit 88 at a high level (S3).

By this, a completely independent multiple analog PLL circuit constituted by the oscillator 78, prescalers 81 to 84, phase comparator 85, switch circuits 87 and 88, LPF 52, and VCO 86 as shown in FIG. 7 is constituted.

Further, after switching the operation mode to the VCO control mode (traverse control mode), the control signals VP0 to VP7 set in accordance with the calculated value are output to the prescaler 84 of the DSP circuit 40 (S4).

After this, the pick-up is traversed to the point of A minutes by using the usual track jump routine (S5).

Next, the operation mode is switched from the VCO control mode (traverse control mode) to the normal operation mode, the control signal ICAP is output to the switch circuit 87 at a high level, and the control signal INV.VPCO is output to the switch circuit 88 at a low level (S6).

By this, not using the configuration of the independent multiple analog PLL circuit shown in FIG. 7, the output signal S77 of the rotational speed counting circuit 77 is supplied as the control voltage of the VCO 86 via the LPF 52, the oscillation frequency of the VCO 86 tracks the rotational speed of the disc 31, a PLL circuit of a wide capture range is realized, and a normal reproduction operation is carried out.

Figure 11:
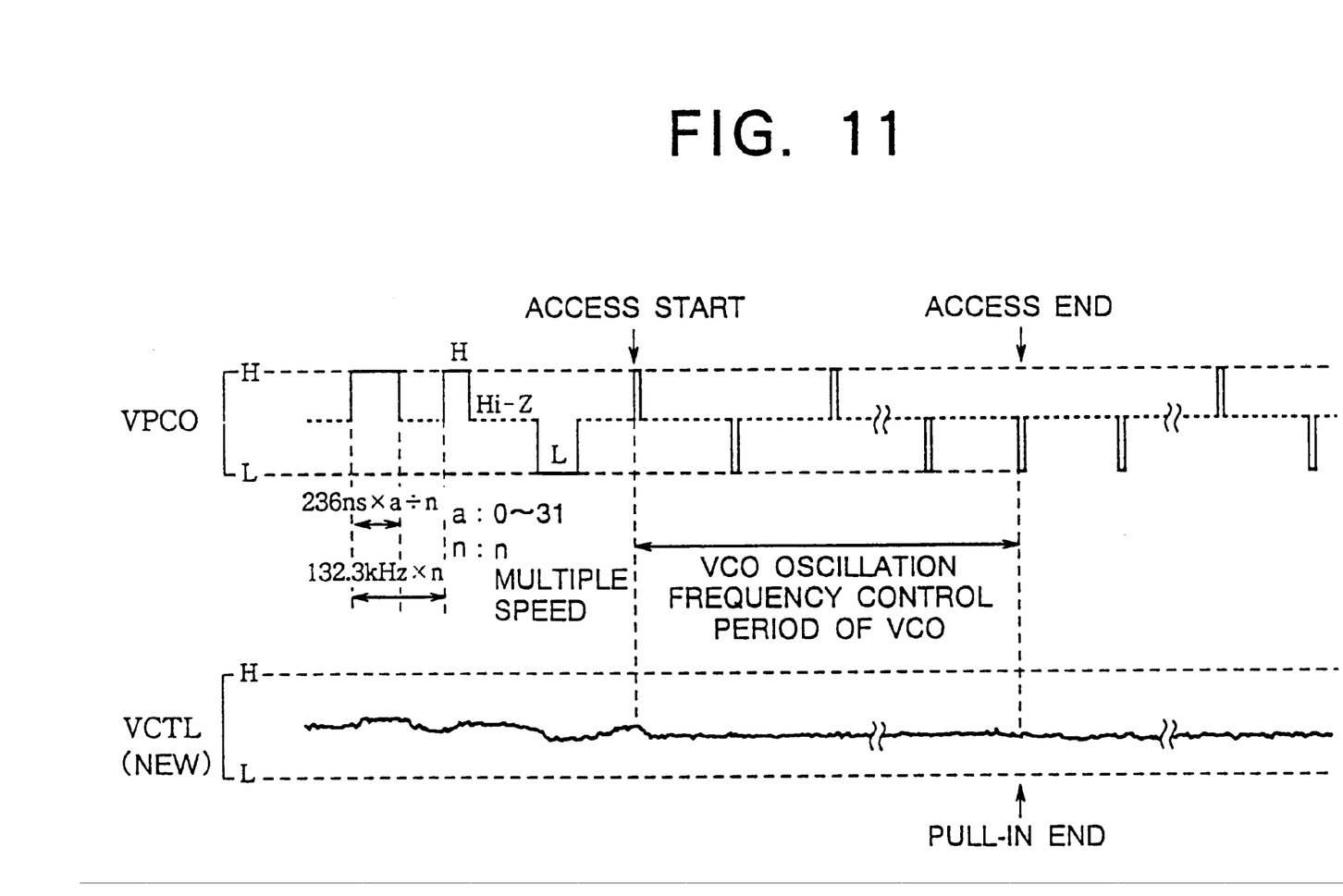
FIG. 11 is a view of the state of the output signal of the phase comparator at external terminals VPCO and VCTL at the time of access of the circuit of FIG. 6.

FIG. 11 shows a state of the output signal of the phase comparator at the external terminals VPCO and VCTL at the time of access of the circuit of FIG. 6.

As seen from FIG. 11, in the signal processing circuit according to the present embodiment, the PLL pull-in time after arrival (landing) at the target track is reduced.

As explained above, according to the present embodiment, at the time of normal reproduction, the rotational speed of the spindle is detected based on the reproduction signal from the disc at the rotational speed counting circuit 77, a first control signal S77 that makes the speed error with respect to the reference speed zero is given to the VCO 86 serving as the second oscillating means as the control voltage thereof, and a reproduction clock is generated while controlling the frequency and phase at the digital PLL circuit 95 serving as the second PLL circuit by using the oscillation output thereof as the reference frequency of the first PLL circuit containing the VCO 94. At the time of access, based on for example the control of the controller 60, the control signal to the VCO 86 is switched to the output signal S85 of the phase comparator 85 by the switch circuits 87 and 88, and a multiple PLL circuit containing the VCO 86, phase comparator 85, LPF 53, and so forth, is constituted, thereby making the oscillation frequency of the VCO 85 track the reproduction speed at the destination of access predicted based on the access information at the controller 60. Therefore, not only it is strong against rotary outer disturbance and high speed access, but also control not influenced by the solid difference of the LSI and temperature change is possible and the PLL pull-in time after the arrival (landing) at the target track can be reduced, so an increase of the speed of access time can be achieved.

Further, in for example a CD-DA, the access is carried out for connecting sounds by ESP or the like, and the buffering is carried out from the target, but there are advantages that the starting time thereof becomes earlier and, as a result, an improvement of performance can be achieved.

While the invention has been described with reference to specific embodiments chosen for purposes of illustration, it should be apparent that numerous modifications could be made thereto by those skilled in the art without departing from the basic concept and scope of the invention.

What is claimed is:

1. A signal processing circuit of a disc reproduction device for generating a reproduction clock synchronized with a reproduction signal from the disc and performing signal processing with respect to the reproduction signal based on the reproduction clock, comprising:

a rotational speed counting means for generating a first control signal in accordance with a change of speed of a rotational speed of said disc with respect to a reference speed;

a first oscillating means for generating a first reference clock of a predetermined frequency;

a second oscillating means changing in its oscillation frequency in accordance with said first or second control signal to provide an oscillation signal of said second oscillating means;

a phase comparing means for generating said second control signal in accordance with a phase difference between the first reference clock by said first oscillating means and an oscillation signal of said second oscillating means;

a first PLL circuit for generating a second reference clock of a predetermined frequency based on the oscillation frequency of the oscillation signal of said second oscillating means;

a second PLL circuit for generating said reproduction clock based on said reference clock and controlling said reproduction clock in accordance with the frequency change and phase change of said reproduction signal with respect to this reproduction clock; and a means for switching the first or the second control signal for inputting the first or the second control signal to said second oscillating means at the time of reproduction and access.

2. A signal processing circuit of a disc reproduction device according to claim 1, wherein said control signal switch means has:

a switch means for performing the switching of connection of said second oscillating means with the output line of the first control signal by said rotational speed counting means or said phase comparing means based on a third control signal and a controlling means for outputting said third control signal in accordance with the reproduction or access operation mode.

3. A signal processing circuit of a disc reproduction device according to claim 2, further comprising:

a frequency dividing means for dividing the frequency of the oscillation output of said second oscillating means and inputting the same to said phase comparing means and said controlling means controls said frequency dividing means at least at the time of access.

4. A signal processing circuit of a disc reproduction device according to claim 3, wherein said controlling means predicts a reproduction speed at the destination of access based on access information and controls said frequency dividing means in accordance with the predicted speed.

5. A signal processing circuit of the disc reproduction device according to claim 2, wherein said switch means inverts the output signal of said phase comparing means and inputs the same to said second oscillating means at the time of access.

6. A signal processing circuit of a disc reproduction device according to claim 1, further comprising:

a low pass filter set to a predetermined time constant between said control signal switching means and said second oscillating means.

7. A signal processing circuit of a disc reproduction device for generating a reproduction clock synchronized with a reproduction signal from the disc and performing signal processing with respect to the reproduction signal based on this reproduction clock, comprising:

a spindle for rotationally driving the disc;

a rotational speed counting means for detecting a rotational speed of the spindle based on the reproduction signal and generating a first control signal in accordance with a speed error with respect to a reference speed;

a first oscillating means for generating a first reference clock of a predetermined frequency;

a second oscillating means changing in its oscillation frequency in accordance with the first or second control signal to provide an oscillation signal of the second oscillating means;

a phase comparing means for detecting a phase difference between the first reference clock by the first oscillating means and the oscillation signal of the second oscillating means and generating the second control signal in accordance with the result of detection;

a first PLL circuit for generating a second reference clock of a predetermined frequency based on the oscillation frequency of the oscillation signal of the second oscillating means;

a second PLL circuit for generating a reproduction clock based on the second reference clock, detecting a frequency error and phase error of the reproduction signal with respect to this reproduction clock, and controlling the frequency and phase of the reproduction clock in accordance with the frequency error and phase error thereof; and a control signal switching means for inputting the first control signal by the rotational speed counting means to the second oscillating means at the time of reproduction and inputting the second control signal by the phase comparing means to the second oscillating means at the time of access.

8. A signal processing circuit of a disc reproduction device according to claim 7, wherein said control signal switch means has:

a switch means for performing the switching of connection of said second oscillating means with the output line of the first control signal by said rotational speed counting means or said phase comparing means based on a third control signal and a controlling means for outputting said third control signal in accordance with the reproduction or access operation mode.

9. A signal processing circuit of a disc reproduction device according to claim 8, further comprising:

a frequency dividing means for dividing the frequency of the oscillation output of said second oscillating means and inputting the same to said phase comparing means and said controlling means controls said frequency dividing means at least at the time of access.

10. A signal processing circuit of a disc reproduction device according to claim 9, wherein said controlling means predicts a reproduction speed at the destination of access based on access information and controls said frequency dividing means in accordance with the predicted speed.

11. A signal processing circuit of the disc reproduction device according to claim 8, wherein said switch means inverts the output signal of said phase comparing means and inputs the same to said second oscillating means at the time of access.

12. A signal processing circuit of a disc reproduction device according to claim 7, further comprising:

a low pass filter set to a predetermined time constant between said control signal switching means and said second oscillating means.

* * * * *